（12）United States Patent
Hsieh (10) Patent No.: US 8,929,700 B2
(45) Date of Patent: Jan. 6, 2015

(54) SINGLE-PACKAGE DUAL OPTICAL-FUNCTION DEVICE

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 394 days.

(21) Appl. No.: 13/450,455

(22) Filed: Apr. 18, 2012

(65) Prior Publication Data

US 2012/0269482 A1    Oct. 25, 2012

Related U.S. Application Data

(60) Provisional application No. 61/478,501, filed on Apr. 23, 2011.

(51) Int. Cl.
*G02B 6/32* (2006.01)
*G02B 6/293* (2006.01)

(52) U.S. Cl.
CPC .............. *G02B 6/29358* (2013.01); *G02B 6/32* (2013.01)
USPC ............................................... 385/47; 385/33

(58) Field of Classification Search
USPC ............................................................ 385/47
See application file for complete search history.

(56) References Cited

U.S. PATENT DOCUMENTS 6,310,690 B1 * 10/2001 Cao et al. ....................... 356/519
6,721,078 B1 *  4/2004 Cao ................................ 359/246

\* cited by examiner

*Primary Examiner* — Jerry Rahll
(74) *Attorney, Agent, or Firm* — Antonio R. Durando (57) ABSTRACT

A four-fiber collimator is coupled to the optics of a single interleaver to produce the functionality of two co-packaged interleavers. Two fibers of the collimator are coupled to the core optics of a single interleaver to produce two pairs of output beams. The other two fibers of the collimators are coupled to receive the reflection output beams. The geometry of the optical fibers in the bundle is controlled to produce interleaver outputs with no offset. In another embodiment two fibers of the four-fiber collimator are coupled as inputs to and the other two fibers as outputs from a Fabry-Perot etalon. The geometry of the fibers and the focal length of the collimator are controlled to produce two outputs with peaks offset by a predetermined amount.

20 Claims, 5 Drawing Sheets

SINGLE-PACKAGE DUAL OPTICAL-FUNCTION DEVICE

RELATED APPLICATIONS

This application is based on and claims the priority of U.S. Provisional Application Ser. No. 61/478,501, filed Apr. 23, 2011.

BACKGROUND OF THE INVENTION

1. Field of the Invention

This invention relates to the general field of optical communications and, in particular, to apparatus providing the functionality of two optical devices, such as interleavers or etalons, from the core components of a single device coupled to a four-fiber collimator.

2. Description of the Prior Art

In optical communications, one fiber can carry many communication channels where each channel has its own carrier frequency. The light of different frequencies is merged into the fiber through a device called multiplexer ("mux") in the art and is later separated into different ports through a device called de-multiplexer ("de-mux"). Mux and de-mux devices typically utilize technologies such as thin-film filters (TFF), array wave-guide gratings (AWG), and optical interleavers.

In dense wavelength division multiplexing (DWDM) optical communication, various frequencies $(1/\lambda)$ of laser light (channels) are used as carrier signals and are coupled into the same optical fiber, which acts as a waveguide. Data signals are superimposed over the carrier signals and are transported in the waveguide. Since the total usable wavelength range is limited (about a few tens of nanometers), as channel spacing is decreased, more channels can fit into the same optical fiber and greater communication capacity is achieved. Therefore, the ability to operate at ever reduced channel spacing is an important objective in the art.

However, channel spacing is limited by the capability of the multiplexer and the de-multiplexer to combine and separate channels without signal overlap. Currently, the standard for channel spacing is 100 GHz (0.8 nm) and manufacturing costs increase dramatically to implement a channel spacing smaller than 100 GHz.

When the total number of channels is less than about 20, the technology based on thin-film filtering is preferred because of its wide bandwidth, its good thermal stability, and the facility with which channels may be added to the system. When the number of channels is materially higher (e.g., more than about 40), it has been preferable in the art to use optical devices that provide a more uniform loss throughout the channels and exhibit a smaller chromatic dispersion than thin-film technology. For example, devices based on array waveguide gratings (AWG) and diffraction gratings provide these advantages. However, such devices tend to produce a narrower bandwidth than thin-film technology, which severely limits their application. In turn, a cost-effective method for increasing the bandwidth of multiplexing and de-multiplexing devices with uniform insertion loss throughout the channels and minimal chromatic dispersion has been achieved through the use of optical interleavers.

With an interleaver, it is possible to use lower resolution filters to mux/de-mux channels with a channel spacing that is smaller than the filter's frequency resolution. For instance, in order to de-mux eighty channels with a channel spacing of 50 GHz, the interleaver first separates the light into an odd stream and an even stream. The odd stream contains odd-number channels and the even stream contains even-number channels. By doing so, the channel spacing in each stream becomes 100 GHz. Therefore, one can use 100 GHz filters to separate the channels in each stream. Otherwise, one would have to use 50 GHz filters, which are more expensive than 100-GHz ones, to de-mux all 80-channel optical signals.

Figure 1:
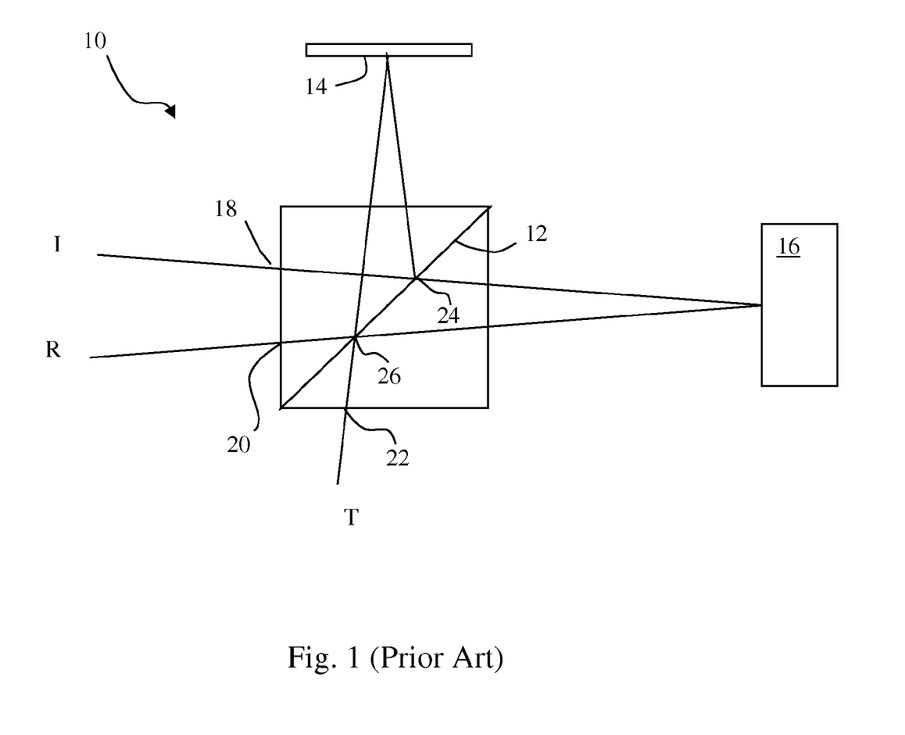
FIG. 1 illustrates schematically a conventional de-mux interleaver as a 3-port device in a free-space Michelson interferometer configuration.

A conventional free-space de-mux interleaver is a 3-port device. As shown schematically in FIG. 1 in a Michelson interferometer configuration, an optical de-mux interleaver 10 includes a 50/50 beamsplitter 12 combined with a mirror 14 and an etalon structure 16. A single incoming light beam I is incident on a common (input) port 18 and two output beams R,T exit from respective output ports 20,22. A portion of the incoming beam I is first reflected at point 24 of the beamsplitter, and then it is reflected by the mirror 14 and returned to the beamsplitter at point 26, where it is reflected again and transmitted on a 50/50 energy split. The beam returned to point 26 has a phase that is a linear function of its optical frequency. The other portion of the incoming beam I at point 24 of the beamsplitter is transmitted to and phase shifted by the phase optics 16; then it is returned to the beamsplitter at point 26, where itself is also reflected and transmitted on a 50/50 energy split. This beam returned to point 26 has a phase that is a nonlinear function of its optical frequency. The phase difference between the linear phase produced by mirror 14 and the nonlinear phase produced by the phase optics 16 determines which optical frequencies (wavelengths) are in the passband and in the stopband at each of the output ports 20 (the reflection beam R) and 22 (the transmission beam T). The etalon 16 typically includes a tuner and consists preferably of a Gires-Tournois etalon.

Dual-fiber collimators are widely used in DWDM, such as in fixed wavelength filters, optical switches, and interleavers, due to their compactness and reliability. In a dual-fiber collimator, two bare fibers are placed next to each other inside a capillary. Therefore, the center-to-center distance between two fibers, for standard SMF-28 fibers, is nominally 125 um. Both fibers share one collimating lens and the tips of the fibers are located near the focus plane of the collimating lens. As a result, the collimated beams from the two fibers lie at a small angle determined by the center-to-center distance and the focal length of the collimating lens. For instance, in a dual-fiber collimator with a 6.5-mm focal length, the angle between the two collimated beams is about 1.1 degrees.

Multiple fibers can similarly share a collimating lens. Accordingly, due to their compactness, in recent years a variety of multiple-fiber collimators have been used, mainly for optical switches. In such optical-switch applications, the switch works for all wavelengths in a band, there is no ITU alignment requirement, and the insertion loss (the most important parameter in most applications) is low, which renders the use of multiple-fiver collimators very desirable.

As well understood in the art, the free spectral range (FSR) of an etalon is determined by the cavity length; that is, the distance between the two reflective surfaces of the etalon. When the incident beam is not normal to the cavity (such as caused by the position of the input fiber), the effective cavity length is reduced according to a cosine law. As a result, the FSR is increased and the transmission peaks of the cavity are shifted. For instance, using a dual-fiber collimator with a 6.5-mm focal length for a 50 GHz etalon, the effective cavity length is reduced by 0.14 um. (For the purposes of this description, um≡μm.) It is well known that, when the cavity length is changed by a distance equal to one-half wavelength, the transmission peaks will shift by one FSR. Therefore, a 0.14 um change in the effective cavity length will cause the transmission peaks to shift by 8.9 GHz.

Figure 2:
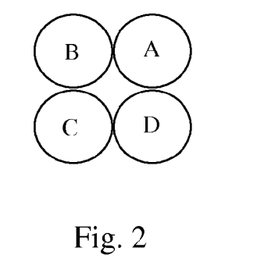
FIG. 2 is a schematic cross-section of the ideal arrangement of four optical fibers in a capillary tube, such that the centers of the fibers lie at the corners of a square.
Figure 3:
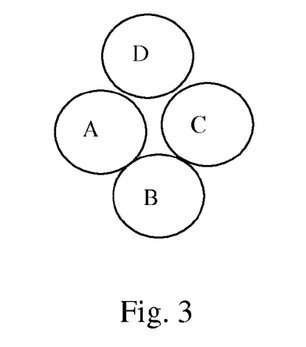
FIG. 3 is a schematic cross-section of a more realistic arrangement of four optical fibers in a capillary tube, wherein the centers of the fibers lie at the corners of a diamond-shaped figure (not a square).

Furthermore, due to the tolerance of both the capillary and the fiber diameters, the center-to-center capillary distance could cause an error of several um, as illustrated in ideal and more realistic configurations in FIGS. 2 and 3, respectively, and the focal length of the collimating lens could have a tolerance of a few percent. Thus, the focal-length error and the fiber-distance error can cause the angle between the two collimated beams to be materially off the desired design value. Therefore, it is important to control these parameters to obtain the desired output.

Figure 4:
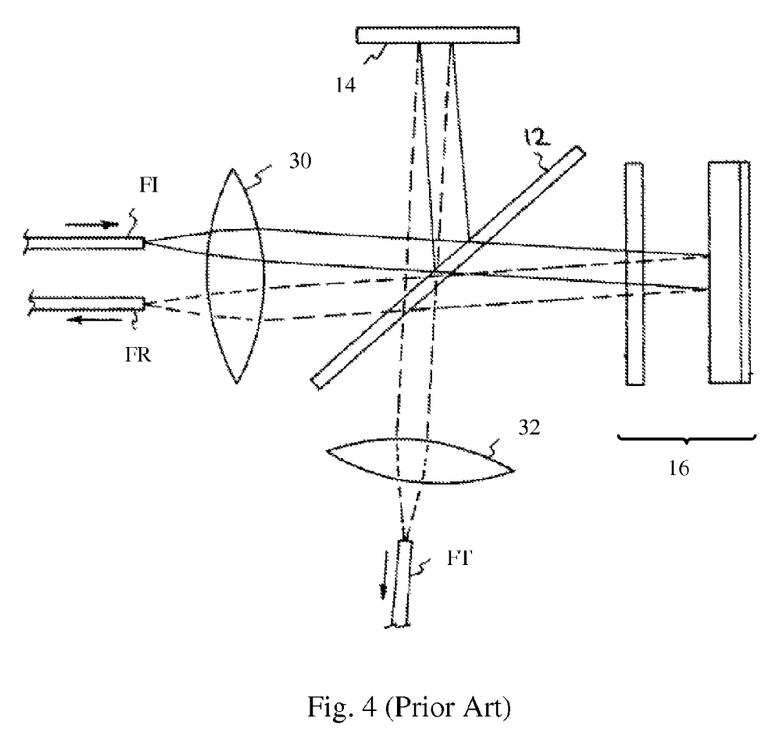
FIG. 4 illustrates schematically an implementation of the de-mux interleaver of FIG. 1 in a GT etalon configuration coupled to a dual-fiber collimator.

In dual-fiber interleaver applications, such as described in U.S. Pat. No. 6,587,204, the input collimator has two fibers. As illustrated in FIG. 4, one fiber FI is for input, the other fiber FB for the reflection channel. The transmission channel only needs one fiber FT to receive the transmission beam. The core optics (beam splitter 12, mirror 14, etalon 16 with tuner) of the interleaver is placed inside a housing (not shown) and the collimators 30 and 32 are aligned to optimize the performance. The interleaver is then tuned conventionally to align its output reflection and transmission peaks to a predetermined grid, for instance ITU. (See U.S. Pat. No. 6,816,315 for an example of suitable tuning apparatus.) All the even channels (wavelengths) of the ITU grid are directed to the transmission port and all odd channels (wavelengths) to the reflection port, or vice versa. The present invention is directed at providing the functionality of two dual-fiber interleavers with the core optics of a single one.

SUMMARY OF THE INVENTION

This invention is based on the idea of using a four-fiber collimator coupled to the optics of a single interleaver or a single etalon structure in order to produce the functionality of two co-packaged devices. As used herein, the terms "phase optics" and "phase-optics unit" are intended to refer to devices capable of producing a phase shift in a light beam. In the preferred embodiment for interleaver operation, the core optics of the invention includes a beam-splitter surface adapted to produce reflected beams and transmitted beams, a mirror surface optically coupled to the beam-splitter surface to receive the reflected beams, an etalon with a tuner optically coupled to the beam-splitter surface to receive the transmitted beams, and the four-fiber collimator directing a pair of input beams from two fibers of the collimator toward the beam-splitter surface and receiving two reflection output beams into the other pair of fibers coupled to the collimator. It is understood that the mirror and the etalon can be coupled equivalently in reverse to the beam-splitter so as to receive the transmitted and reflected beams, respectively. In either case, the core optics (the interleaver) is adapted to produce a predetermined wavelength difference, according to design, between the reflection and transmission beams of each pair of interleaver outputs.

In its simplest embodiment directed to interleaver applications, the geometry of the optical fibers in the bundle is controlled to produce two interleaver outputs (the reflection beams) with the same FSR and no offset between the periodic peaks. This is obtained principally by aligning the fibers with their centers in square configuration, so as to produce two outputs with peaks aligned to the grid of interest without offset.

In another embodiment used for wavelength locker applications, for example, the four-fiber collimator is simply coupled to nonlinear phase optics, such as an etalon. The fibers are aligned with their centers in diamond configuration, so as to produce two reflection outputs with peaks offset by a predetermined amount as a result of the difference in the respective angles of propagation of the input beams from the collimating lens toward the etalon. Because of the inherent function of the optics, the relationship between the geometry of the four-fiber collimator and the offset in the corresponding outputs can be calculated theoretically and implemented directly through the functionally co-packaged device of the invention.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

Figure 5:
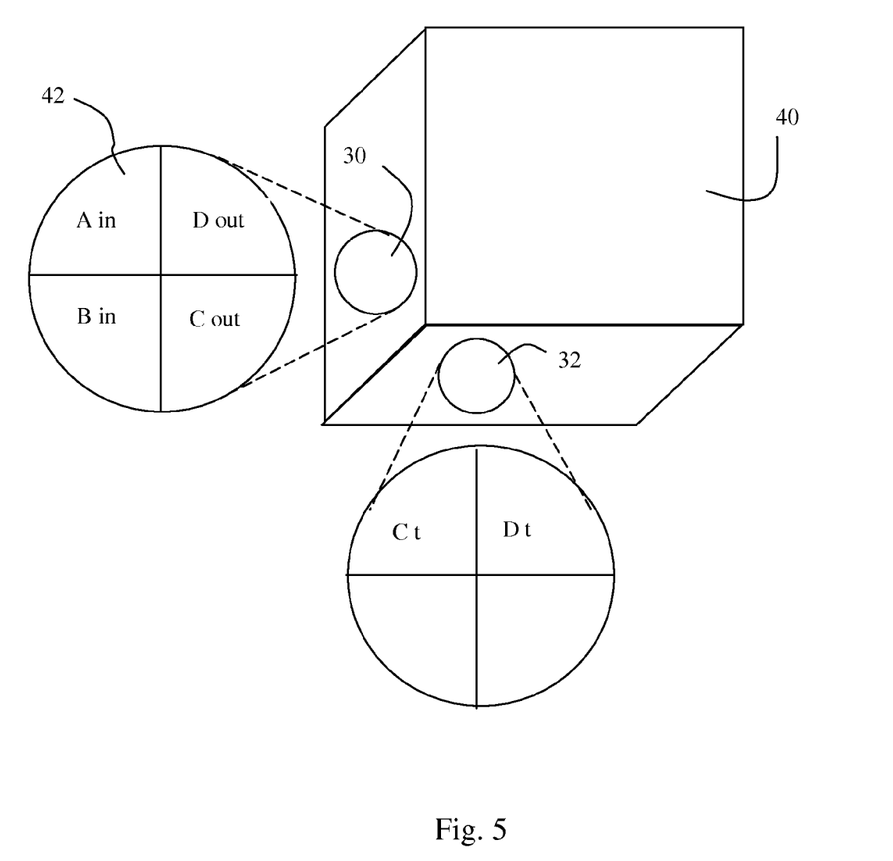
FIG. 5 illustrates the combination of a four-fiber collimator with the core optics of a single optical phase-optics unit according to the invention.

The invention is based on the recognition that a four-fiber collimator can advantageously be used to provide the functionality of two dual-fiber interleavers or two etalons using the core optics of a single device. As illustrated by the schematic cross-sections of FIGS. 2 and 3, when a four-fiber collimator 42 is used for interleaver operation, two fibers (A and B, for example) may be used as input channels and the other two fibers (C and D) for reflection channels in combination with a single optical interleaver unit, such as shown schematically in FIG. 5. Fibers $A_{in}$ and $B_{in}$ are for input, fibers $C_{out}$ and $D_{out}$ are for the reflection output channels, and fibers $C_t$ and $D_t$ are for the transmission output channels. (Obviously, the pair of input fibers can be different, such as using fibers A and D, with correspondingly different output fibers.) For the purposes of describing the invention, the letters A-D are used to identify the four fibers of a four-fiber collimator with subscripts used to indicate their functionality, when relevant to the explanation.

Referring to an implementation where the housing 40 includes the core optics of FIG. 4, for example, the wavelengths of the input beam through fiber $A_{in}$ are reflected by the interleaver 12 to be received by fiber $C_{out}$. Similarly, the input beam at fiber $B_{in}$ is reflected by the same interleaver 12 and returns to fiber $D_{out}$. Because of the four-fiber input, two other fibers $C_t$ and $D_t$ (and collimating/focusing optics 32) are needed at the transmission output port. Thus, the three fibers $A_{in}$, $C_{out}$ and $C_t$ function as the three fibers of a dual-fiber interleaver. The other three fibers ($B_{in}$, $D_{out}$ and $D_t$) provide the simultaneous function of a second dual-fiber interleaver. Therefore, one can advantageously obtain two interleavers in a single package.

Figure 6:
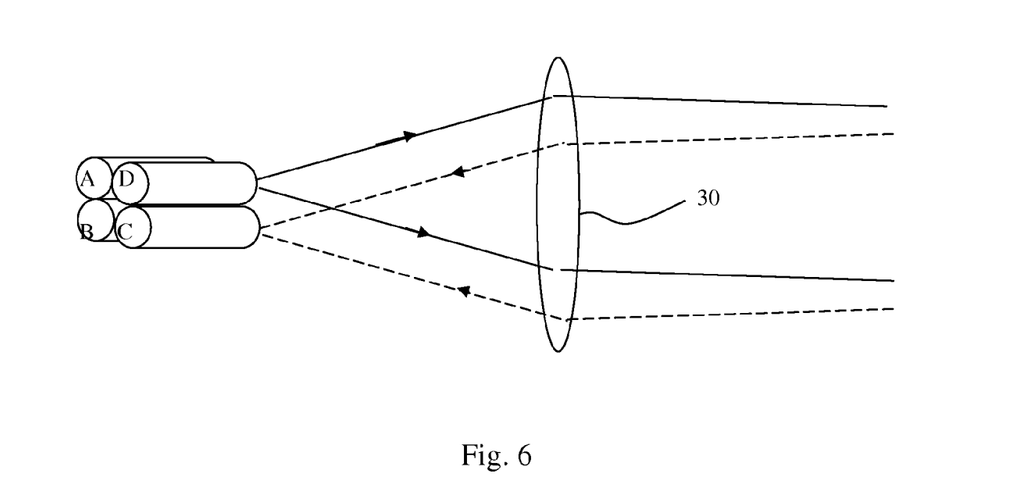
FIG. 6 illustrates a four-fiber collimator, as used to implement the invention, with the fiber tips placed near the focal plane of the collimating lens.

FIG. 6 illustrates a four-fiber collimator, as used to implement the invention, with the fiber tips placed near the focal plane of the collimating lens. Only the paths of the input beam from fiber A (solid line) and the output beam returning to fiber C (broken line) are shown. When the angle between the two collimated beams of fibers A and C is different from that of fibers B and D due to the fiber-bundle geometry and the lens tolerances discussed above, the wavelength of the output peaks for one interleaver will be different from that of the other interleaver. For instance, for a 6.5 mm collimator, if the fiber center-to-center distance of AC is greater than that of BD by 1 um, then the output peak will be off by 0.203 GHz, as shown by Table 1 below.

TABLE 1

Wavelength shift for every one micron error in the fiber center-to-center distance.

| Focal length of a four-fiber collimator [mm] | Wavelength shift [GHz] Opposite fibers AC or BD* |
|---|---|
| 6.5 | 0.203 |
| 5.0 | 0.343 |
| 4.1 | 0.51 |
| 3.25 | 0.811 |
| 2.4 | 1.486 |

*Nominal fiber gap AC or BD = 176.8 um

Figure 7:
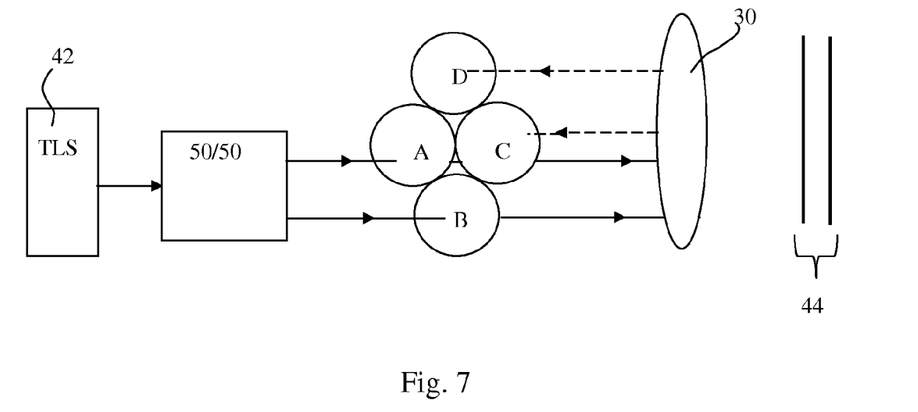
FIG. 7 is a schematic representation of the components used to measure the peaks of the pair of output beams produced by the invention to determine the wavelength difference between the two sets of peaks.

Therefore, the use of a four-fiber collimator in the co-package design of the invention to make two identical interleavers requires that the angle between the two collimated beams formed by the input-output pair AC be matched to that formed by the other input-output pair BD. Because both pairs of fibers share the same lens, the wavelength difference between the two sets of output peaks from AC and BD can be measured and the appropriate correction made (or the four-fiber collimator is deemed out of specification). Using a tunable laser 42, an etalon 44, and two photo detectors 46 and 48, as illustrated in FIG. 7, the peaks for both pairs of reflection output beams (C,D) can be measured simultaneously, thereby deriving the wavelength difference between the peaks of the two beams. As those skilled in the art readily understand, this difference has to be as small as possible (less than 3% of the channel spacing) for interleaver applications to assure that both sets of peaks are reasonably aligned to the predetermined grid simultaneously. However, it is understood that the same four-fiber collimator can be used advantageously for other applications having a different predetermined grid, such as for a wavelength locker, as addressed below.

Figure 8:
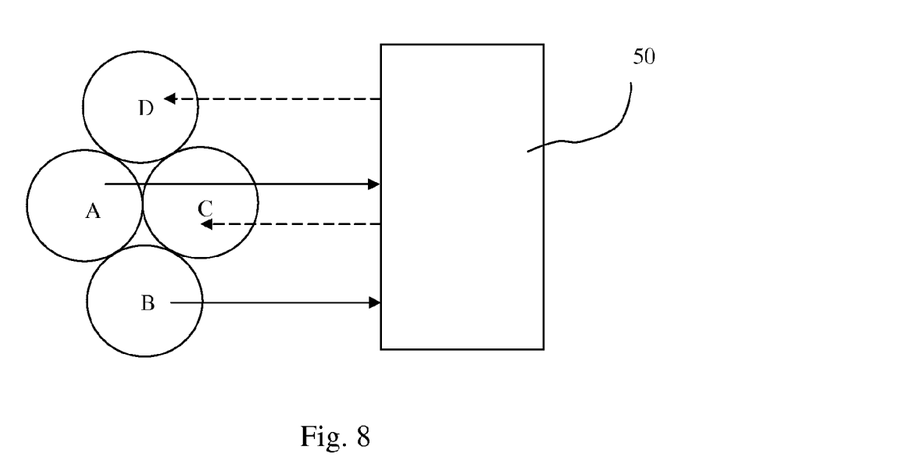
FIG. 8 is a schematic representation of another embodiment of the invention wherein a four-fiber collimator is coupled to a single nonlinear phase-optics device.
Figure 9:
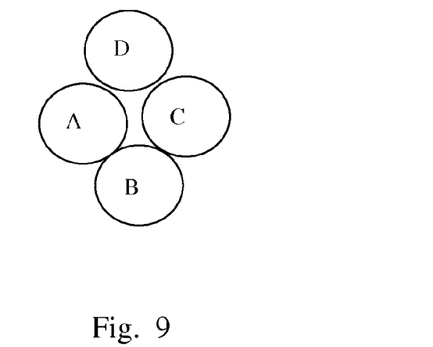
FIG. 9 illustrates a four-fiber collimator arrangement such that the center-to-center distance BD is much greater than the center-to-center distance AC in order to produce a predetermined wavelength difference between the two sets of output peaks.

In the preferred embodiment used for interleaver functions, the four fibers are arranged to form a square, as shown in FIG. 2. The angle between the two collimated beams formed by the input-output pair AC is matched to that formed by the other input-output pair BD. In this case, there is no wavelength difference between the peaks if the two pairs. However, the fibers can be arranged differently (such as illustrated in FIG. 9, for example) in order to intentionally induce a specific wavelength difference between the two sets of output peaks. In such case, only nonlinear phase optics (such as a Fabry Perot etalon) appropriately coupled to the four-fiber collimator is required. This would be the objective for wavelength locker applications, for instance. Such an intentional result can be achieved by arranging the four fibers such that the center-to-center distance BD is much greater than the center-to-center distance AC (in theory, such that BD=$\sqrt{3}$×AC). The output of the collimator is coupled directly to a tunable etalon 50, as shown in FIG. 8.

In addition, as mentioned above, the focal length can affect the effective cavity thickness. Thus, it is critical that this parameter also be included in the design of the device to yield no wavelength difference or a predetermined difference, as desired, between the output peaks produced by fiber A in fiber C with respect to those produced by fiber B in fiber D. It is not easy to control the fiber center-to-center distance to a specific distance other than those obtained by contacting the fibers in simple configurations, such as those shown in FIGS. 2 and 9, but the focal length of the collimator can also be used to achieve the desired goal. In the configuration of FIG. 9, for example, because the fiber diameter is about 125 um with very high accuracy, the fiber center-to-center distance BD is geometrically equal to $\sqrt{3}$ times the fiber center-to-center distance AC. Therefore, the output peaks from fibers A and C with respect to those from fibers B and D will be offset and can be shifted by a required offset amount (an intentional wavelength difference) by choosing a focal length as follows:

Beam angle 1=$a\tan(AC/2/f)$, and

Beam angle 2=$a\tan(BD/2/f)$, where f is the focal length of the collimating optics 30.

Beam angle 1 is one half the angle of the two collimated beams from the two fibers A and C. After proper alignment, Beam angle 1 is equal to the incident beam angle with respect to the reflective surface of an etalon. Similarly, Beam angle 2 is from the two fibers B and D. The effective cavity length (ECL) is a cosine function of the incident beam angle, as follows:

ECL1=Cavity length*cos(Beam angle 1), and

ECL2=Cavity length*cos(Beam angle 2).

The difference between ECL1 and ECL2 determines the wavelength shift. Table 2 below shows the wavelength shift as a function of the focal length using a four-fiber collimator arranged in the configuration shown in FIG. 9.

TABLE 2

Wavelength shift as a function of focal length using a four-fiber collimator arranged in the format shown in FIG. 8.

| | 3-mm cavity | | | 6-mm cavity | | |
|---|---|---|---|---|---|---|
| focal length [mm] | ECL1-ECL2 [nm] | Wavelength shift [FSR] | Remainder [FSR] | ECL1-ECL2 [nm] | Wavelength shift [FSR] | Remainder [FSR] |
| 4.0 | 732 | 94% | −6% | 1464 | 189% | −11% |
| 4.2 | 664 | 86% | −14% | 1328 | 171% | −29% |
| 4.4 | 605 | 78% | −22% | 1210 | 156% | −44% |
| 4.6 | 554 | 71% | −29% | 1107 | 143% | 43% |
| 4.8 | 508 | 66% | −34% | 1017 | 131% | 31% |

TABLE 2-continued

Wavelength shift as a function of focal length using a four-fiber collimator arranged in the format shown in FIG. 8.

| | 3-mm cavity | | | 6-mm cavity | | |
|---|---|---|---|---|---|---|
| focal length [mm] | ECL1-ECL2 [nm] | Wavelength shift [FSR] | Remainder [FSR] | ECL1-ECL2 [nm] | Wavelength shift [FSR] | Remainder [FSR] |
| 5.0 | 469 | 60% | −40% | 937 | 121% | 21% |
| 5.2 | 433 | 56% | −44% | 866 | 112% | 12% |
| 5.4 | 402 | 52% | −48% | 803 | 104% | 4% |
| 5.6 | 374 | 48% | 48% | 747 | 96% | −4% |
| 5.8 | 348 | 45% | 45% | 696 | 90% | −10% |
| 6.0 | 325 | 42% | 42% | 651 | 84% | −16% |
| 6.2 | 305 | 39% | 39% | 610 | 79% | −21% |
| 6.4 | 286 | 37% | 37% | 572 | 74% | −26% |
| 6.6 | 269 | 35% | 35% | 538 | 69% | −31% |
| 6.8 | 253 | 33% | 33% | 507 | 65% | −35% |
| 7.0 | 239 | 31% | 31% | 478 | 62% | −38% |
| 7.2 | 226 | 29% | 29% | 452 | 58% | −42% |
| 7.4 | 214 | 28% | 28% | 428 | 55% | −45% |
| 7.6 | 203 | 26% | 26% | 406 | 52% | −48% |
| 7.8 | 193 | 25% | 25% | 385 | 50% | 50% |
| 8.0 | 183 | 24% | 24% | 366 | 47% | 47% |
| 8.2 | 174 | 22% | 22% | 349 | 45% | 45% |
| 8.4 | 166 | 21% | 21% | 332 | 43% | 43% |
| 8.6 | 158 | 20% | 20% | 317 | 41% | 41% |
| 8.8 | 151 | 20% | 20% | 303 | 39% | 39% |
| 9.0 | 145 | 19% | 19% | 289 | 37% | 37% |

Thus, for a 3-mm cavity, one can use a 4.1-mm collimator to achieve a wavelength shift equal to −10% FSR. Similarly, for a 6-mm cavity, one can use a 5.8-mm collimator to achieve a wavelength shift near −10% FSR. Using a tuner (as taught in U.S. Pat. No. 6,816,315, for example), one can align the first set of output peaks to be on the correct side of a predetermined grid, with an offset from the grid equal to one half the target wavelength difference. The second set will be located on the other side of the grid automatically. Therefore, one can obtain two devices with a specific offset between the two sets of peaks in one package. Again, the target wavelength difference between the two sets of output peaks can be measured using a tunable laser, an etalon, and two photo detectors, as illustrated in FIG. 7.

In both applications (interleaver and wavelength locker), a single set of core optics is advantageously housed in a single package. The collimator alignment procedure is similar to that used for a dual-fiber collimator. After the first pair of beams of the four-fiber collimator is aligned, the second pair is automatically aligned. This reduces not only material costs, but also the cost of labor. Furthermore, it reduces the footprint of the core optics because of the shared space.

Using a different fiber arrangement and properly selecting the focal length of the collimator, one can obtain a specific wavelength difference between two sets of output peaks. As a result, one can obtain two devices with a specific offset between the two sets of peaks in a single package. These two devices similarly share the same housing, the same core optics (including the same tuner), with the attendant advantages mentioned above.

Thus, a simple approach has been disclosed to implement the function of two dual-fiber interleavers or two wavelength lockers in a single package using the core optics of a single phase-optics unit. While the invention has been shown and described in what are believed to be the most practical and preferred embodiments, it is recognized that departures can be made therefrom within the scope of the invention. Therefore, the invention is not to be limited to the details disclosed herein, but is to be accorded the full scope of the claims so as to embrace any and all equivalent apparatus and methods.

I claim:

1. A dual optical-function device comprising:
   a phase-optics unit; and
   a four-fiber collimator directing a pair of input beams from two fibers of the collimator toward said phase-optics unit and receiving two reflection output beams from the phase-optics unit into two other fibers of the collimator;
   wherein said input beams are collimated and said output beams are focused by a single collimating lens of the four-fiber collimator.

2. The device of claim 1, wherein said phase-optics unit includes interleaver optics producing a predetermined wavelength difference between said two reflection output beams and two corresponding transmission output beams of the interleaver optics.

3. The device of claim 2, wherein said four-fiber collimator is configured so as to produce substantially no wavelength difference between said two reflection output beams.

4. The device of claim 2, wherein said interleaver optics includes:
   a beam-splitter surface adapted to receive said pair of input beams and produce respectively a pair of reflected beams and a pair of transmitted beams;
   a mirror surface optically coupled to said beam-splitter surface to receive and reflect back one of said pairs of reflected and transmitted beams;
   an etalon coupled to said beam-splitter surface to receive and reflect back another of said pairs of reflected and transmitted beams.

5. The device of claim 4, wherein said four-fiber collimator is configured so as to produce substantially no wavelength difference between said two reflection output beams.

6. The device of claim 4, wherein said is a Gires-Tournois etalon.

7. The device of claim 1, wherein said phase-optics unit includes:
   a beam-splitter surface adapted to receive said pair of input beams and produce respectively a pair of reflected beams and a pair of transmitted beams;
   a mirror surface optically coupled to said beam-splitter surface to receive and reflect back one of said pairs of reflected and transmitted beams;
   a Gires-Tournois etalon coupled to said beam-splitter surface to receive and reflect back another of said pairs of reflected and transmitted beams; and
   wherein said four-fiber collimator is configured so as to produce substantially no wavelength difference between said two reflection output beams.

8. The device of claim 1, wherein said phase-optics unit includes an etalon and said four-fiber collimator is configured so as to produce a predetermined wavelength difference between said two reflection output beams.

9. The device of claim 8, wherein said etalon is a Fabry Perot etalon.

10. The device of claim 1, wherein said phase-optics unit includes a Fabry Perot etalon and said four-fiber collimator is configured so as to produce a predetermined wavelength difference between said two reflection output beams.

11. A method of obtaining a dual function from a single optical device, comprising the steps of:
   directing a pair of input beams from two fibers of a four-fiber collimator toward a phase-optics unit, and
   receiving two reflection output beams from the phase-optics unit into two other fibers of the collimator;

wherein said input beams are collimated and said output beams are focused by a single collimating lens of the four-fiber collimator.

12. The method of claim 11, wherein said phase-optics unit includes interleaver optics producing a predetermined wavelength difference between said two reflection output beams and two corresponding transmission output beams of the interleaver optics.

13. The device of claim 12, wherein said four-fiber collimator is configured so as to produce substantially no wavelength difference between said two reflection output beams.

14. The method of claim 12, wherein said interleaver optics includes:
a beam-splitter surface adapted to receive said pair of input beams and produce respectively a pair of reflected beams and a pair of transmitted beams;
a mirror surface optically coupled to said beam-splitter surface to receive and reflect back one of said pairs of reflected and transmitted beams;
an etalon coupled to said beam-splitter surface to receive and reflect back another of said pairs of reflected and transmitted beams.

15. The method of claim 14, wherein said four-fiber collimator is configured so as to produce substantially no wavelength difference between said two reflection output beams.

16. The method of claim 14, wherein said etalon is a Gires-Tournois etalon.

17. The method of claim 11, wherein said phase-optics unit includes:
a beam-splitter surface adapted to receive said pair of input beams and produce respectively a pair of reflected beams and a pair of transmitted beams;
a mirror surface optically coupled to said beam-splitter surface to receive and reflect back one of said pairs of reflected and transmitted beams;
a Gires-Tournois etalon coupled to said beam-splitter surface to receive and reflect back another of said pairs of reflected and transmitted beams; and
wherein said four-fiber collimator is configured so as to produce substantially no wavelength difference between said two reflection output beams.

18. The method of claim 11, wherein said phase-optics unit includes an etalon and said four-fiber collimator is configured so as to produce a predetermined wavelength difference between said two reflection output beams.

19. The method of claim 18, wherein said etalon is a Fabry Perot etalon.

20. The method of claim 11, wherein said phase-optics unit includes a Fabry Perot etalon and said four-fiber collimator is configured so as to produce a predetermined wavelength difference between said two reflection output beams.

\* \* \* \* \*